United States Patent
Allen et al.

(10) Patent No.: US 12,468,969 B2
(45) Date of Patent: Nov. 11, 2025

(54) METHODS FOR CORRELATED HISTOGRAM CLUSTERING FOR MACHINE LEARNING

(71) Applicant: Incucomm, Inc., Addison, TX (US)

(72) Inventors: Randal Allen, Orlando, FL (US); Brice Brosig, Denton, TX (US)

(73) Assignee: INCUCOMM, INC., Addison, TX (US)

(*) Notice: Subject to any disclaimer, the term of this patent is extended or adjusted under 35 U.S.C. 154(b) by 699 days.

(21) Appl. No.: 17/808,093

(22) Filed: Jun. 21, 2022

(65) Prior Publication Data

US 2023/0119704 A1   Apr. 20, 2023

Related U.S. Application Data

(60) Provisional application No. 63/202,667, filed on Jun. 21, 2021.

(51) Int. Cl.
   *G06N 7/02* (2006.01)

(52) U.S. Cl.
   CPC .................. *G06N 7/023* (2013.01)

(58) Field of Classification Search
   CPC ........ G06N 7/023; G06N 3/088; G06N 5/048; G06N 7/01; G06N 20/00
   See application file for complete search history.

(56) References Cited

U.S. PATENT DOCUMENTS

| | | | | |
|---|---|---|---|---|
| 10,812,496 B2* | 10/2020 | Anderson | ........... | H04L 63/1416 |
| 2015/0245137 A1* | 8/2015 | Sugano | ............... | G10L 21/0232 |
| | | | | 381/73.1 |

OTHER PUBLICATIONS

DARPA, (2018), https://www.darpa.mil/news-events/2018-07-20a; Accelerating the Exploration of Promising Artificial Intelligence Concepts; Outreach@darpa.mil, Jul. 20, 2018, 3 pages.

Knight, W., (2017), The U.S. Military Wants Its Autonomous Machines to Explain Themselves, 8 pages. https://www.technologyreview.com/s/603795/the-us-military-wants-its-autonomous-machines-to-explain-themselves.

Lamberth, M., (2019), The White House and Defense Department unveiled AI strategies. Now what?, 7 pages. https://www.c4ismet.com/opinion/2019/02/27/the-white-house-and-defense-department-unveiled-ai.

Shimazaki, H. and Shinomoto, S., (2007), A method for selecting the bin size of a time histogram, Neural Computation 19(6), 1503-1527, 2007, http://dx.doi.org/10.1162/neco.2007.19.6.1503.

Tadjdeh, Y., Interview with NDIA's Senior Fellow for AI, National Defense Magazine, Jan. 10, 2020; 6 pages. https://www.nationaldefensemagazine.org/articles/2020/1/10/interview-with-ndias-senior-fellow-for-aistrategies-now-what.

Akinshin, A., (2020), Lowland Multimodality Detection 11 pgs, https://aakinshin.net/posts/lowland-multimodality-detection/.

Akinshin, A., (2020), Quantile-respectful Density Estimation Based on the Harrell-Davis Quantile Estimator, 7 pgs. https://aakinshin.net/posts/qrde-hd/.

Harrell, F. and Davis C., (1982), A new distribution-free quantile estimator, Biometrika 69(3), pp. 635-640. https://pdfs.semanticscholar.org/1a48/9bb74293753023c5bb6bff8e41e8fe68060f.pdf.

* cited by examiner

*Primary Examiner* — Cesar B Paula
*Assistant Examiner* — Zelalem Shalu
(74) *Attorney, Agent, or Firm* — Boisbrun Hofman, PLLC

(57) ABSTRACT

A methodology for correlated histogram clustering for machine learning which does not require a priori knowledge of cluster numbers, which extends beyond bimodal scenarios to multimodal scenarios, and does not need iterative optimization methods nor require powerful data processing.

20 Claims, 14 Drawing Sheets

METHODS FOR CORRELATED HISTOGRAM CLUSTERING FOR MACHINE LEARNING

CROSS-REFERENCE TO RELATED APPLICATIONS

This application claims the benefit of U.S. Provisional Patent Application Ser. No. 63/202,667, filed on Jun. 21, 2021, entitled "Correlated Histogram Clustering", the disclosure of which is incorporated herein by reference.

REFERENCES

DARPA, (2018), https://www.darpa.mil/news-events/2018-07-20a

Knight, W., (2017), The U.S. Military Wants Its Autonomous Machines to Explain Themselves, https://www.technologyreview.com/s/603795/the-us-military-wants-its-autonomous-machines-to-explain-themselves Lamberth, M., (2019), The White House and Defense Department unveiled AI strategies. Now what?, https://www.c4ismet.com/opinion/2019/02/27/the-white-house-and-defense-department-unveiled-ai-strategies-now-what Shimazaki, H. and Shinomoto, S., (2007), A method for selecting the bin size of a time histogram, Neural Computation 19(6), 1503-1527, 2007, http://dx.doi.org/10.1162/neco.2007.19.6.1503

Tadjdeh, Y., Interview with NDIA's Senior Fellow for A, National Defense Magazine, 10 Jan. 2020, https://www.nationaldefensemagazine.org/articles/2020/1/10/interview-with-ndias-senior-fellow-for-ai Akinshin, A., (2020), Lowland Multimodality Detection, https://aakinshin.net/posts/lowland-multimodality-detection/

Akinshin, A., (2020), Quantile-respectful Density Estimation Based on the Harrell-Davis Quantile Estimator, https://aakinshin.net/posts/qrde-hd/

Harrell, F. and Davis C., (1982), A new distribution-free quantile estimator, Biometrika 69(3), pp. 635-640. https://pdfs.semanticscholar.org/1a48/9bb74293753023c5bb6bff8e41e8fe68060f.pdf

TECHNICAL FIELD

The present disclosure is directed, in general, to machine learning and, more specifically, to methods for correlated histogram clustering.

BACKGROUND

There are three types of machine learning which depend on how the data is being processed. The first type is supervised learning where a model is trained on known input and output data to predict future outputs. There are two subsets to supervised learning: regression techniques for continuous response prediction and classification techniques for discrete response prediction. The second type is unsupervised learning which uses clustering to identify patterns in the input data only. There are two subsets to unsupervised learning: hard clustering where each data point belongs to only one cluster and soft clustering where each data point can belong to more than one cluster. Finally, the third type is reinforcement learning where a model is trained on successive iterations of decision-making, where rewards are accumulated based on the results of the decisions. A machine learning practitioner will recognize there are many methods to solve these problems, each having their own set of implementation requirements. Table 1 samples the state of the art of supervised/unsupervised machine learning.

TABLE 1

| Machine Learning Methods | | | |
|---|---|---|---|
| | | UNSUPERVISED | |
| SUPERVISED | | Soft | Hard |
| Regression | Classification | Clustering | Clustering |
| Ensemble methods | Decision trees | Fuzzy-C means | Hierarchical clustering |
| Gaussian process | Discriminant analysis | Gaussian mixture | K-means |
| General linear model | K-nearest neighbor | | K-medoids |
| Linear regression | Logistic regression | | Self-organizing maps |
| Nonlinear regression | naïve Bayes | | DBSCAN |
| Regression tree | Neural nets | | |
| Support vector machine | Support vector machine | | |

Unsupervised Learning and its Disadvantages

During a January 2020 National Defense Magazine interview, a Senior Fellow for Artificial Intelligence (AI) of the National Defense Industrial Association (NDIA) expressed how algorithms and frameworks have evolved beyond supervised learning into unsupervised and reinforcement learning. The focus of the invention disclosed herein is on the unsupervised learning aspect of machine learning. The goal of unsupervised learning is to gain insight about the underlying structure of the data. As indicated in Table 1, unsupervised learning may be separated into hard clustering and soft clustering.

Techniques of hard clustering involve circumstances where each data point belongs to one and only one cluster. Example approaches are k-means, k-medoids, self-organizing maps, and hierarchical clustering. With k-means, data is divided into "k" different clusters where the choice of which data point belongs to which cluster is determined by a distance metric. In the end, an overall centroid (which may or may not coincide with a data point) is determined for each cluster. K-medoids is very similar to k-means with the exception that the centroid is directly associated with a data point. For both of these approaches, a priori knowledge of the number of clusters is needed. Self-organizing maps are neural net-based and have all the corresponding criticisms (e.g., shallow, greedy, brittle, and opaque). See, for example, U.S. Patent Application Publication 2020/0193075 (the "'075 Publication"), Jun. 18, 2020, System and Method for Constructing a Mathematical Model of a System in an Artificial Intelligence Environment, incorporated herein by reference. Hierarchical clustering deals with data pairs and involves a binary tree. While an exemplary embodiment described hereinafter deals with a bimodal scenario, other embodiments are easily extended to higher dimensions, leaving hierarchical clustering behind.

Techniques of soft clustering include situations where each data point can belong to more than one cluster. One soft approach is "fuzzy c-means" which is similar to k-means but allows the data to associate with more than one cluster—still, the number of clusters must be determined a priori. The other soft approach is a Gaussian mixture model similar to "fuzzy c-means" where data points may belong to more than one cluster. Clusters are determined from different Gaussian distributions, requiring optimization methods to determine the associated parameters of the distributions. For each of these methods, the number of clusters still must be known a priori. One approach relies upon neural nets and their inherent disadvantages (self-organizing maps). Another only deals with data pairs and results in a binary tree structure (hierarchical clustering). Gaussian mixture models require optimization techniques. For all these approaches, powerful processing is needed to handle large amounts of data.

What is needed in the art is an approach that does not require a priori knowledge of cluster numbers, which extends beyond bimodal scenarios to multimodal scenarios, and does not need iterative optimization methods nor require powerful data processing.

SUMMARY

To address the deficiencies of the prior art, disclosed hereinafter is a methodology for correlated histogram clustering for machine learning which does not require a priori knowledge of cluster numbers, which extends beyond bimodal scenarios to multimodal scenarios, and does not need iterative optimization methods nor require powerful data processing.

In an exemplary embodiment, the correlated histogram clustering (CHC) methodology comprises the steps of:

1) generating n histograms for n-dimensional data set, D;
2) selecting a subset (D') of the histogram data based on a frequency greater than a threshold;
   One approach is to select those points with frequencies whose z-scores are positive
3) generating n histograms for n-dimensional data set D' with optimal bin size;
   One approach to building the histograms is optimizing the Shimizaki and Shinomoto cost function based on the mean and variance of bin frequencies.
   Another approach to building histograms is to build Density Estimates and acquire the modes from that rather than a traditional fixed-bin-size histogram.
   Another approach is to use Akinshin's Adaptive Histograms that keep frequency in bins but do not have fixed-bin sizes.
4) identifying m histogram peaks (modes) for each dimension;
   The number "m" of extrema centroid peaks may be any integer, unimodal, bimodal, trimodal, etc.
   One approach is Lowland Modality using Density Estimates
   Another approach is the Harrel-Davis Estimate
   Another approach is using the m-value to determine modality
5) for the $i^{th}$ peak of the $j^{th}$ dimension, $m_{ij}$, identify an index, p, in the data by finding the value in dimension j of D' closest to $m_{ij}$, and set value $C_i$ of centroid C equal to $m_{ij}$;
6) identify the associated data value $D'_{pk}$ for another one of the dimensions, k, and identify the nearest peak from the histogram of $k^{th}$ dimension to $D'_{pk}$, and assign value $C_k$ of centroid C to that peak;
7) repeat step 6 for every dimension of data k through n, k≠I;
8) save centroid C and repeat steps 5-7 for all histogram peaks of the $j^{th}$ dimension; and,
9) repeat steps 5-8 for all dimensions j through n.

BRIEF DESCRIPTION OF THE DRAWINGS

For a more complete understanding of the present disclosure, reference is now made to the following detailed description taken in conjunction with the accompanying drawings, in which.

Corresponding numerals and symbols in the different figures generally refer to corresponding parts unless otherwise indicated and, in the interest of brevity, may not be described after the first instance.

DETAILED DESCRIPTION

The following detailed description discloses a methodology, for use in or training of a machine learning system, for generating correlated histogram clusters. The methodology does not require a priori knowledge of cluster numbers, which extends beyond bimodal scenarios to multimodal scenarios, and does not need iterative optimization methods nor require powerful data processing. With so much effort spent on the various machine learning techniques of unsupervised learning, a relatively simple yet unobvious approach is to leverage statistics and correlate histogram data.

Figure 1:
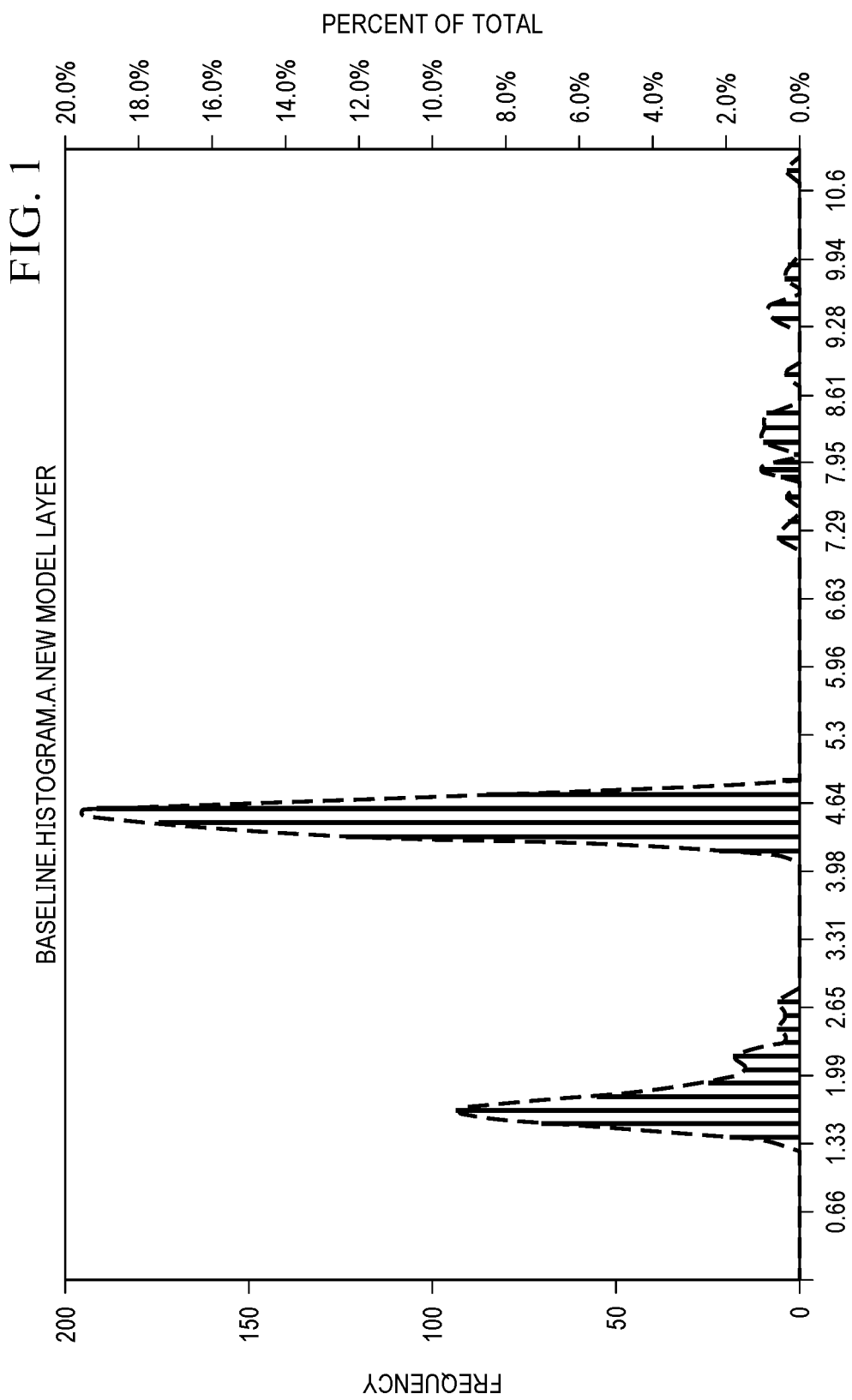
FIG. 1 illustrates a histogram for a first data set A.
Figure 2:
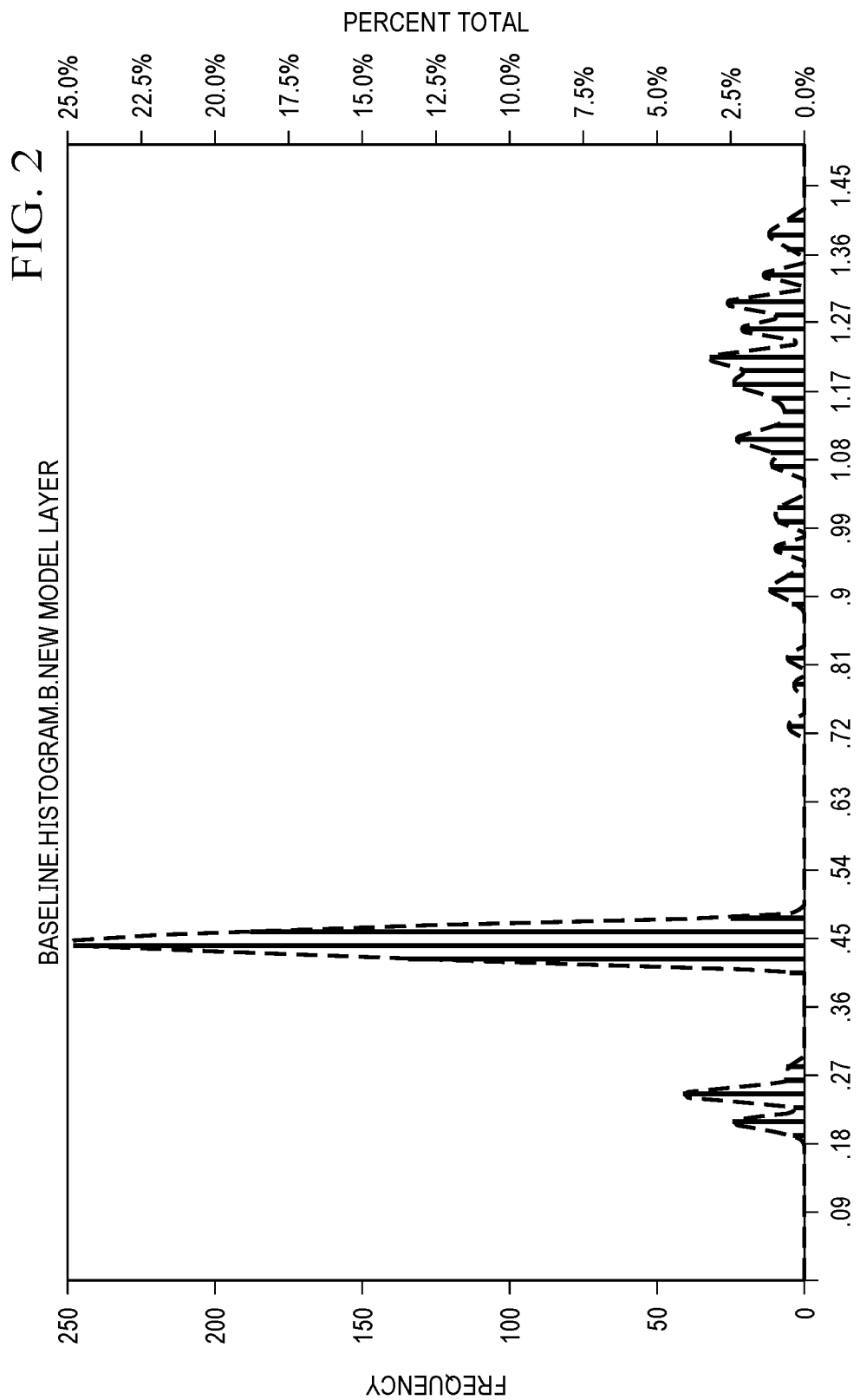
FIG. 2 illustrates a histogram for a second data set B.

FIGS. 1 and 2 illustrate histograms for a first data set A and a second data set B, respectively, representing a multimodal statistical model based on 10,000 pairs of points. By examining FIGS. 1 and 2, one skilled in the art will surmise the histograms most likely correspond to a tri-modal distribution.

Centroids from Coarse Histograms

Selecting a threshold frequency (number of counts) results in a coarse histogram. From coarse histograms, the optimal number of bins can be determined for both data sets. Selecting the larger value results in both histograms having equal resolution. For each data set, multiple extrema may be identified from the counts; and for each extrema, the midpoint of the edge width determines the centroid.

Figure 3:
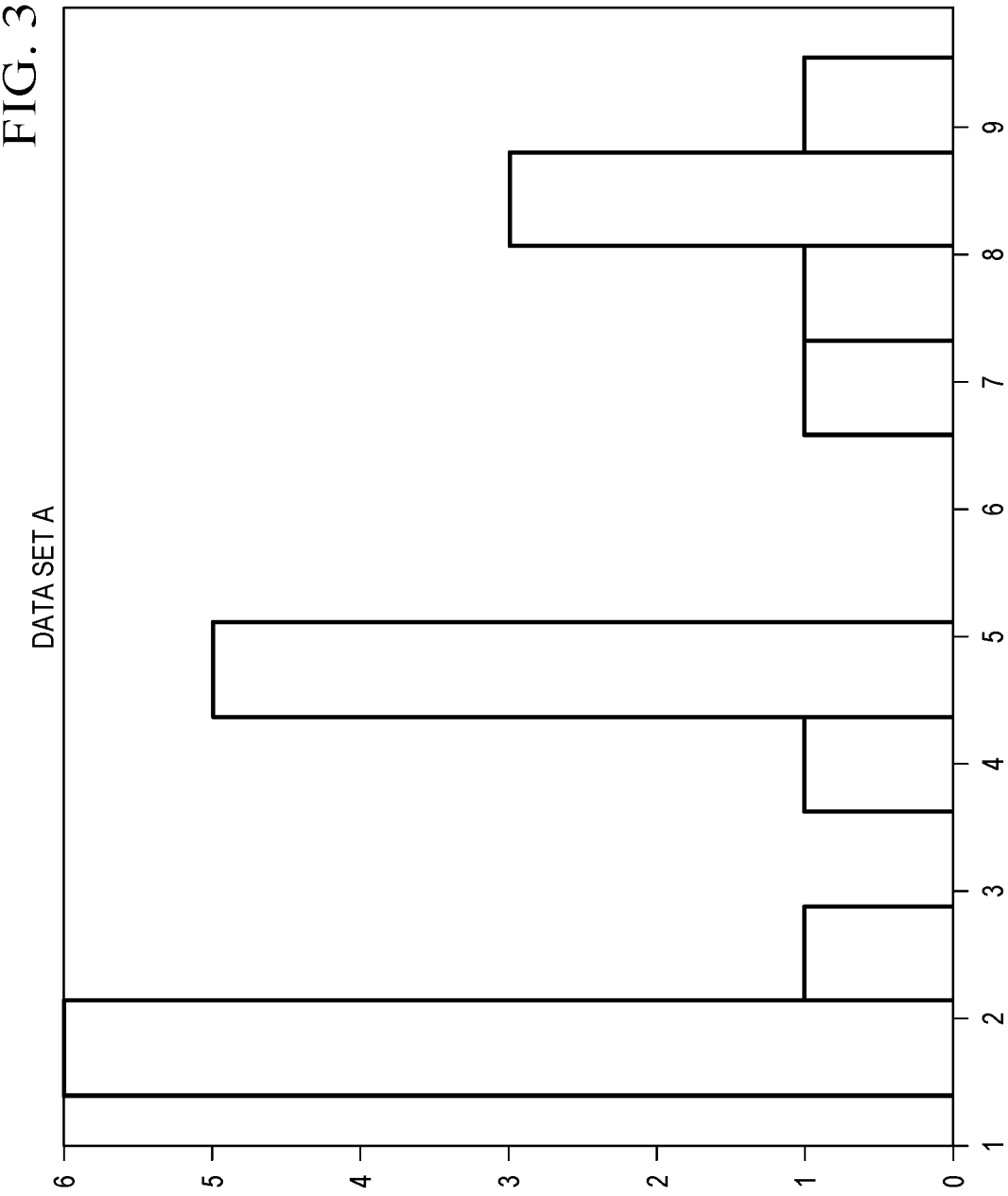
FIG. 3 illustrates a coarse histogram for data set A.
Figure 4:
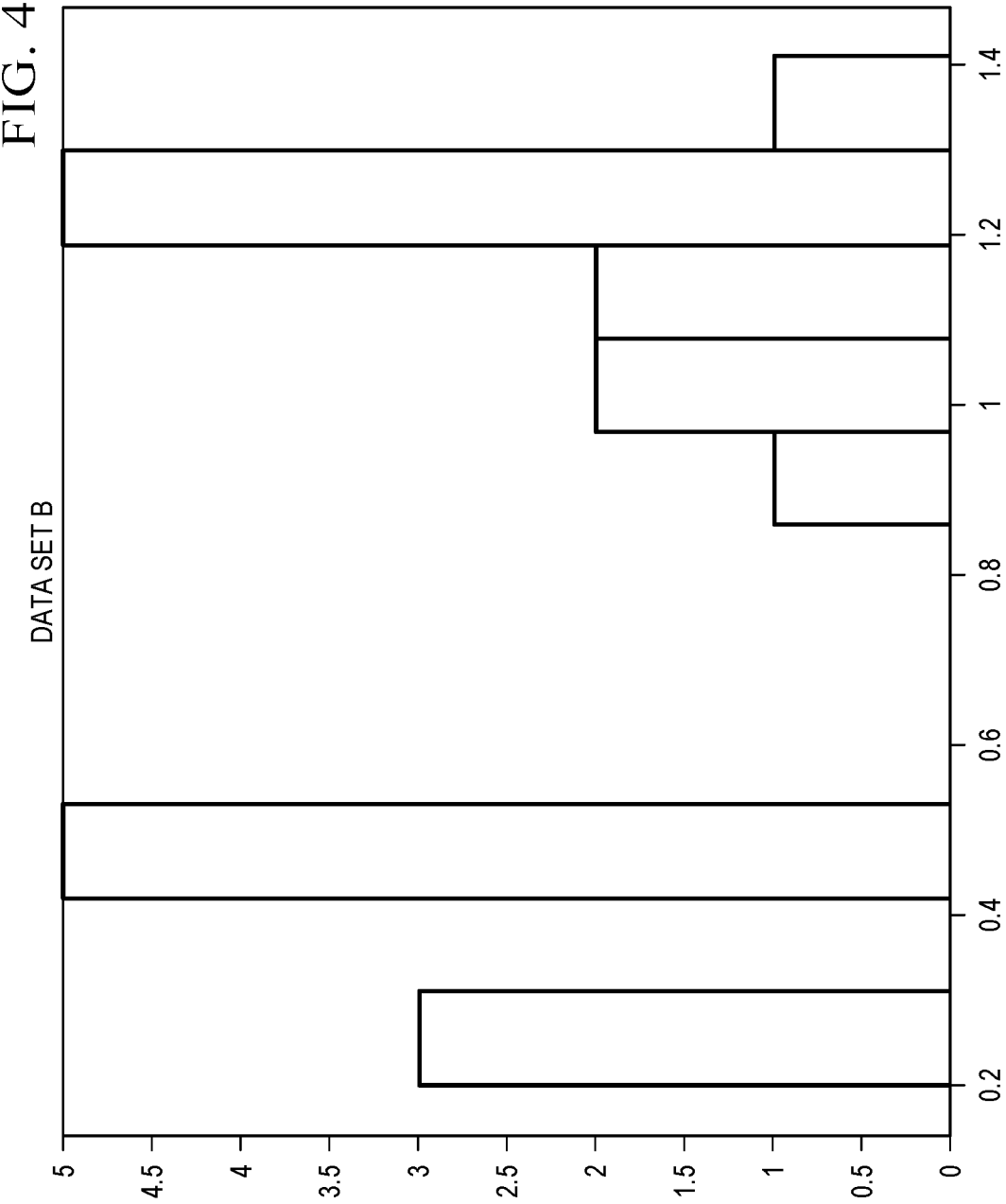
FIG. 4 illustrates a coarse histogram for data set B.

For the histograms illustrated in FIGS. 1 and 2, the corresponding coarse histograms are shown in FIGS. 3 and 4, respectively. The optimal number of bins for data set A is 11 while the optimal number of bins for data set B is 4. As instructed, 11 will be selected for equal resolution. Each data set has 3 peaks (FIGS. 3 and 4) with corresponding edges; i.e., data set A (1.40, 4.36, 8.06) and data set B (0.20, 0.42, 1.19). The widths are A(0.74) and B(0.11) resulting in the modes A(1.77, 4.73, 8.43) and B(0.26, 0.48, 1.25).

Centroids from Density Estimates

In cases where a histogram is not expressive of the underlying modality, a density estimate that is sensitive to modality may be employed. The Harrell-Davis Density Estimator (Harrell, 1982) is one such density estimate, though there are many, that can aid in the identification of peaks. To interpret modes in the density estimates, another method is required—the Lowland Modality Method using Quantile Respective Density Estimates (QRDE) can be used to find modes from a density estimate (Akinshin, 2020). Using this method, modes are defined as the highest peak, M, between two other peaks, P1 and P2, such that the proportion of the bin area between M and $P_i$ and the total rectangular area between the M and $P_i$ is greater than some threshold value, called the sensitivity.

Figure 5:
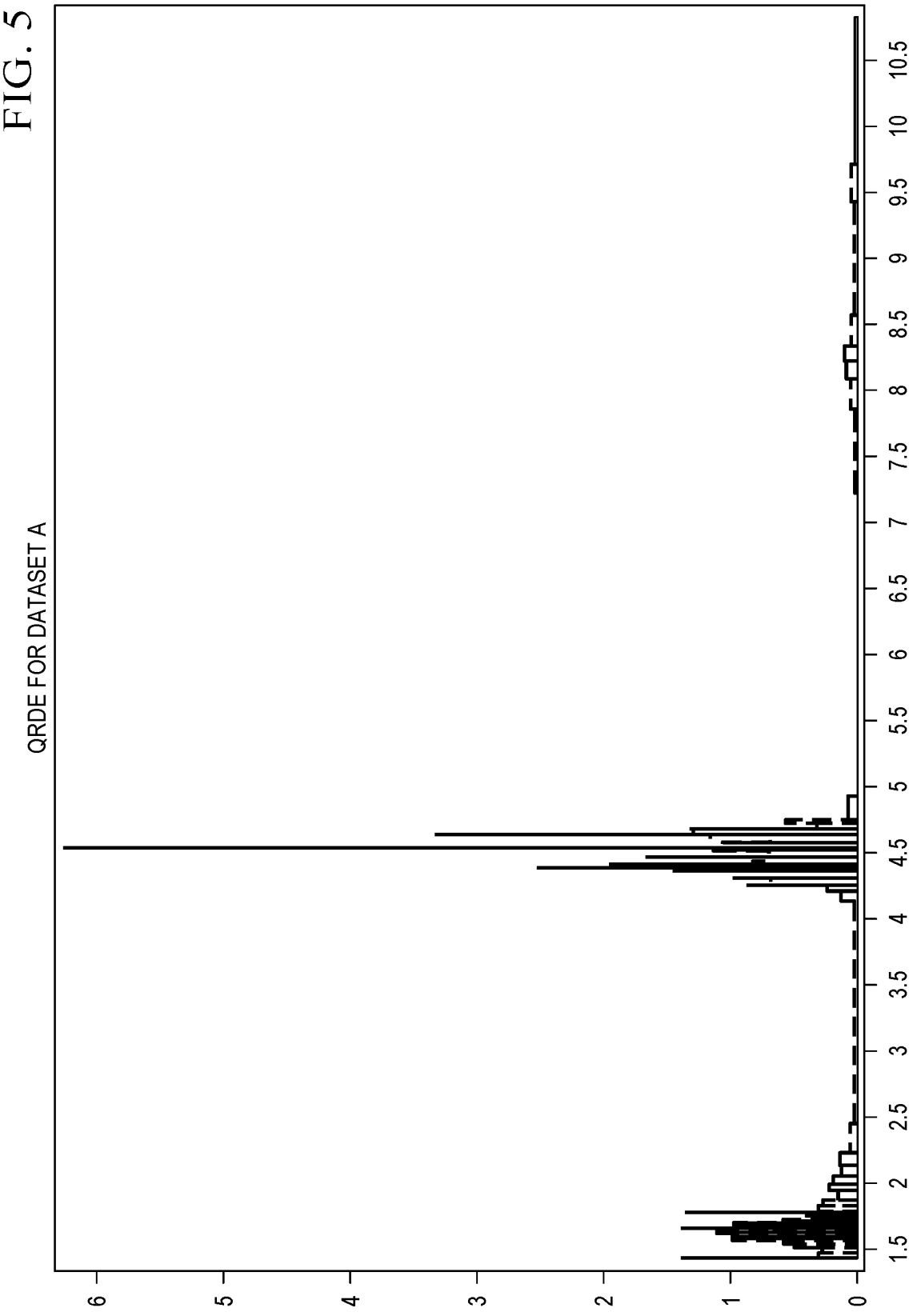
FIG. 5 illustrates a Quantile Respective Density Estimate (QRDE) for data set A.
Figure 6:
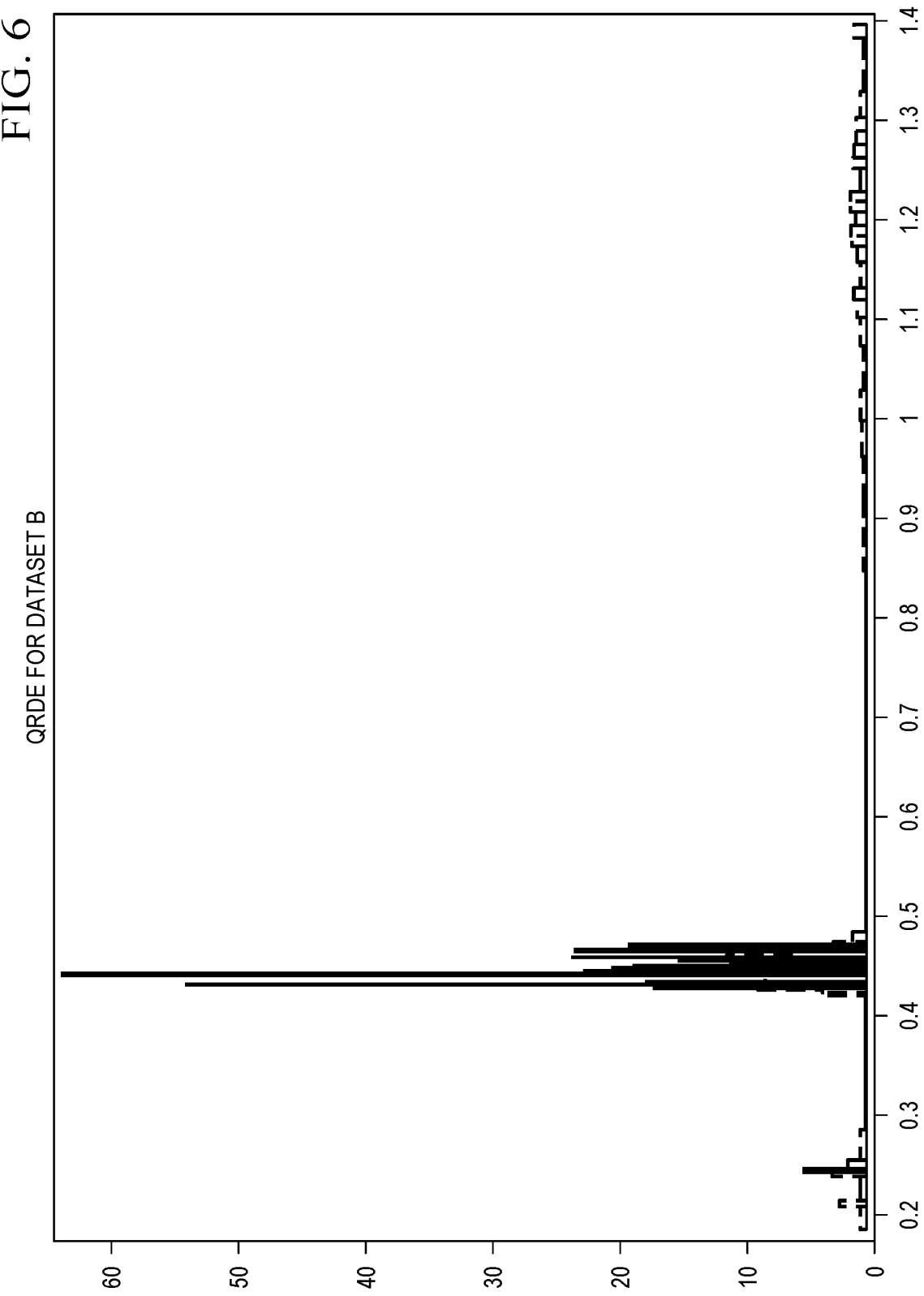
FIG. 6 illustrates a QRDE for data set B.

FIGS. 5 and 6 illustrate QRDEs for data sets A and B, respectively. In this case, the modes for data set A are (1.654, 4.533, 8.280) and modes for data set B are (0.244, 0.441, 1.213). As before, what remains unobvious is the connection between these centroids.

The embodiment described hereinafter will reference centroids found in FIGS. 1 and 2, using the coarse histograms.

Optimal Bin Counts

Any method for constructing a histogram will require the choice of a bin count. There are simple rules-of-thumb for obtaining a bin count like taking the square root of N, taking 1+log(N) (e.g., using the Sturges Method as known to those skilled in the art), or taking 2+cube root of the N where N for all of these is the number data points. These methods rely on the number of data points rather than the underlying statistics of the data. One such approach is to minimize the following function of the mean and variance of the frequencies (Shimazaki and Shinomoto, 2007):

$$\text{score}_n = \frac{(2 * \mu - S^2)}{(\max - \min)^2}$$

As is typically done, histograms, as well as density estimates, are sorted as shown in FIGS. 1 and 2. This sorting approach, however, leads one to believe the order of A's modes are the same as those for B's modes; i.e., A(1.77) goes with B(0.26), A(4.73) goes with B(0.48), and A(8.43) goes with B(1.25). But in this case, they don't go together as one may be led to believe. This can be resolved through indexing.

Indexing

Figure 7:
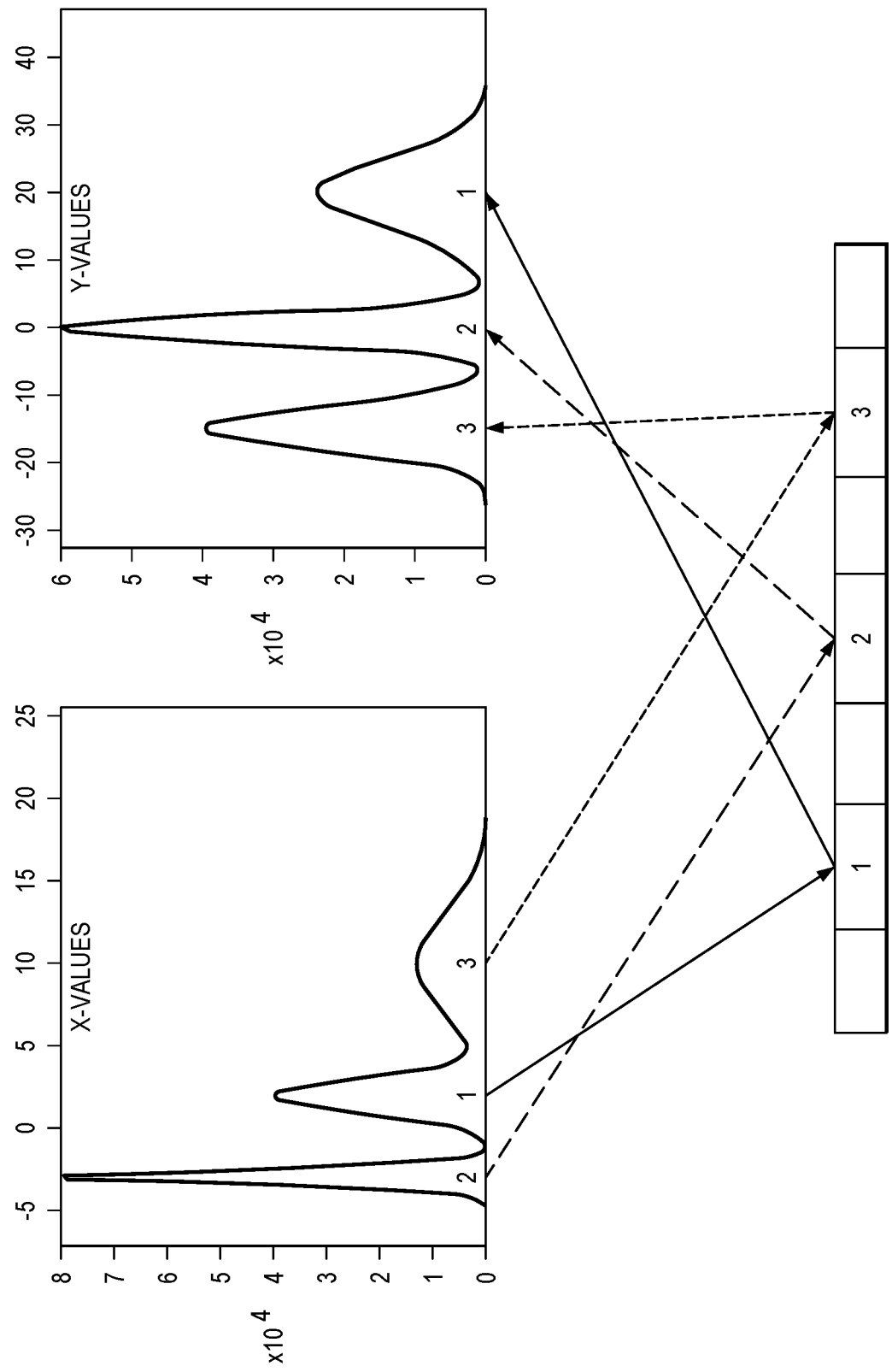
FIG. 7 illustrates a generalization of how histograms can be indexed for correlation.

FIG. 7 illustrates a generalization of how histograms can be indexed for correlation. On the left is a histogram for data set X. Each centroid X-Value has a corresponding index. For data set X, the first centroid (peak) is identified by index 2, the second centroid (peak) is identified by index 1, and the third centroid (peak) is identified by index 3. Histogram correlation is managed by identifying the index with the corresponding centroid B-Values. Index 1 identifies the third B-Value centroid (peak), index 2 identifies the second B-Value centroid (peak), and index 3 identifies the first B-Value centroid (peak).

If the data is indexed, then one simply looks for an index corresponding to a particular centroid (from A's data set) and then uses that same index to locate the other centroid (from B's data set). For example, data set A has one of many indexes that match the value 4.73 (within a few values of the second decimal place), one of which happens to be the index 77. Looking at data set B, index 77 leads one to find a corresponding value of 0.43. Recognizing 0.43 is near 0.48 (within a few values of the second decimal place), one concludes that one of the cluster centroids (A, B) is the pair (4.73, 0.48). It turns out that this just happens to be the same as the second elements in the histogram order for A and B.

Repeating the methodology, data set A has one of many indexes that match the value 8.43 (within a few values of the second decimal place), one of which happens to be the index 79. Looking at data set B, index 79 leads one to find a corresponding value of 0.26, which just happens to coincide with the centroid. Thus, one concludes that another of the cluster centroids (A, B) is the pair (8.43, 0.26). This is not in the order of the histogram data. The third centroid value of A corresponds to the first centroid values of B.

The methodology can be repeated for the last pair or deduced by elimination that is it must be (1.77, 1.25). Of course, this is not in the order of the histogram data. The first mode value of A corresponds to the third mode value of B.

Figure 8:
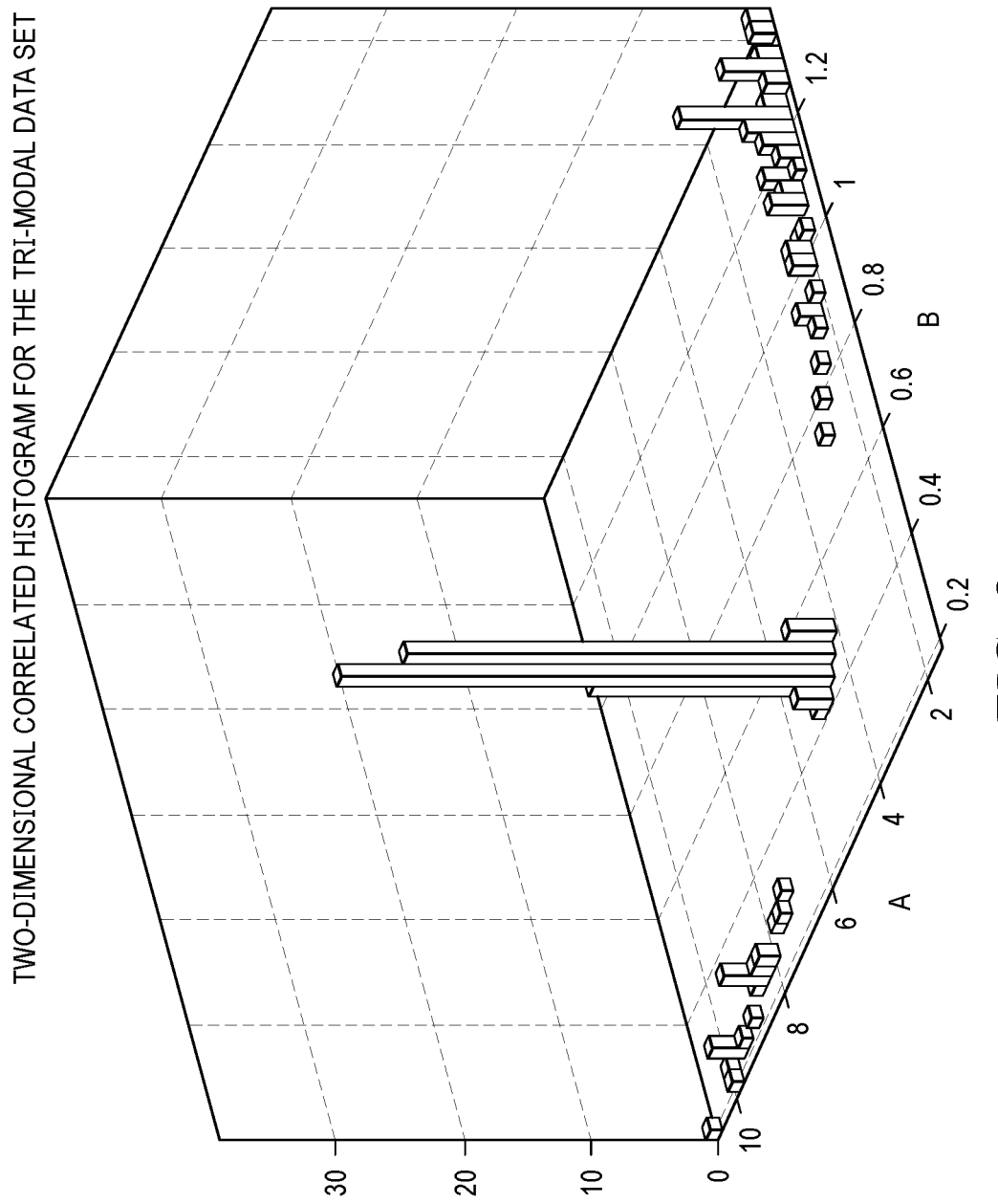
FIG. 8 illustrates a two-dimensional histogram for data sets A and B.

The final set of three correlated centroids are (1.77, 1.25), (4.73, 0.48), and (8.43, 0.26). A visual embodiment of the final result (a two-dimensional histogram) is shown in FIG. 8 with the A-axis along the bottom-left, the B-axis along the bottom-right, and histogram count (frequency) as the vertical axis. Here, clusters are clearly identified. However, in the case of n-dimensions (n>2), a visual embodiment is challenging.

Figure 9:
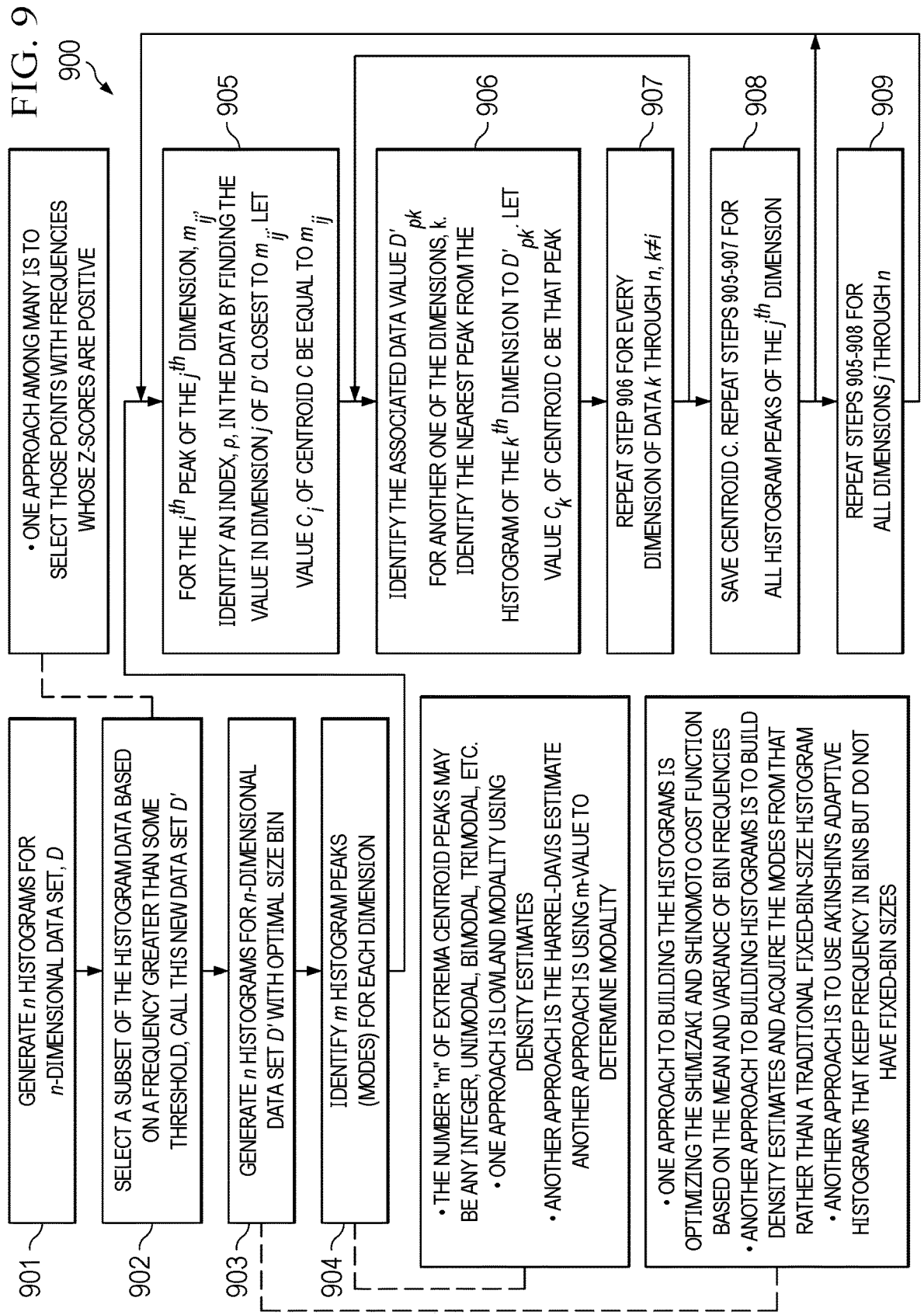
FIG. 9 illustrates a flowchart of a methodology for correlating histograms.

The foregoing methodology can be extended beyond this tri-modal example embodiment of two data sets to an embodiment of a multi-modal, n-dimensional data set without the need for knowing the cluster number a priori and performed rapidly without having to apply advance algorithmic techniques. The correlated histogram clustering ("CHC") methodology is illustrated by the flowchart 900 in FIG. 9, which can be summarized by the following steps:

Step 901: Generate n histograms for n-dimensional data set, D;

Step 902: Select a subset of the histogram data based on a frequency greater than some threshold; call this new data set D';

One approach is to select those points with frequencies whose z-scores are positive Step 903: Generate n histograms for n-dimensional data set D' with optimal bin size;

One approach to building the histograms is optimizing the Shimizaki and Shinomoto cost function based on the mean and variance of bin frequencies.

Another approach to building histograms is to build Density Estimates and acquire the modes from that rather than a traditional fixed-bin-size histogram.

Another approach is to use Akinshin's Adaptive Histograms that keep frequency in bins but do not have fixed-bin sizes.

Step 904: Identify m histogram peaks (modes) for each dimension;

The number "m" of extrema centroid peaks may be any integer, unimodal, bimodal, trimodal, etc.

One approach is Lowland Modality using Density Estimates

Another approach is the Harrel-Davis Estimate

Another approach is using the m-value to determine modality

Step 905: For the $i^{th}$ peak of the $j^{th}$ dimension, $m_{ij}$, identify an index, p, in the data by finding the value in dimension j of D' closest to $m_{ij}$. Let value $C_i$ of centroid C be equal to $m_{ij}$;

Step 906: Identify the associated data value $D'_{pk}$ for another one of the dimensions, k. Identify the nearest peak from the histogram of $k^{th}$ dimension to $D'_{pk}$. Let value $C_k$ of centroid C be that peak;

Step 907: Repeat step 906 for every dimension of data k through n, k≠I;

Step 908: Save centroid C. Repeat steps 905-907 for all histogram peaks of the $j^{th}$ dimension; and, Step 909: Repeat steps 905-908 for all dimensions j through n.

The CHC methodology results in a novel approach to clustering that does not require a priori knowledge of cluster number, extends to multimodal scenarios, and does not need iterative optimization methods nor require powerful data processing.

Comparing Correlated Histogram Methodology to Existing Approaches

Figure 10A:
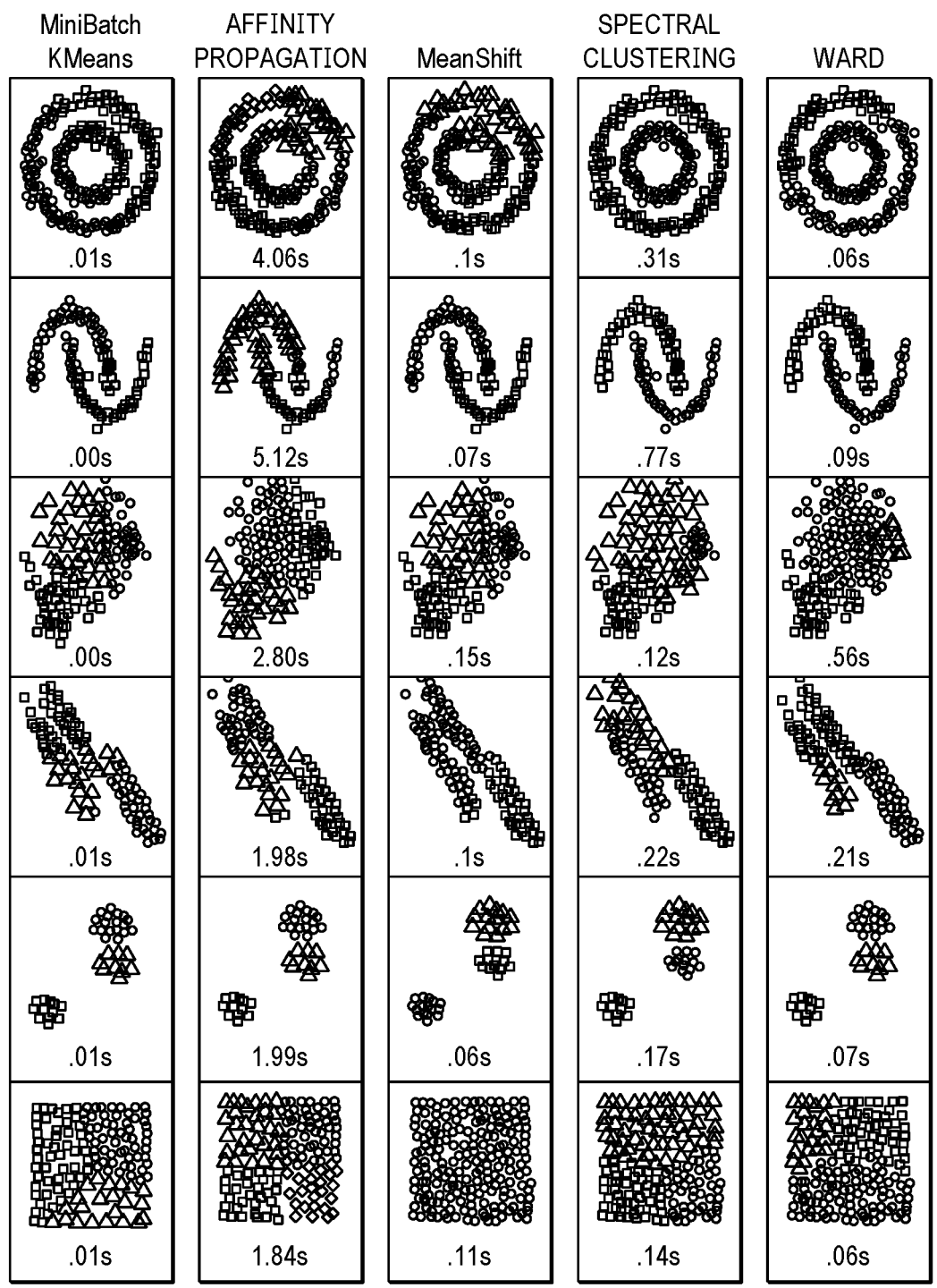
FIGS. 10A and 10B illustrate comparisons of approaches to finding clusters in a dataset.
Figure 10B:
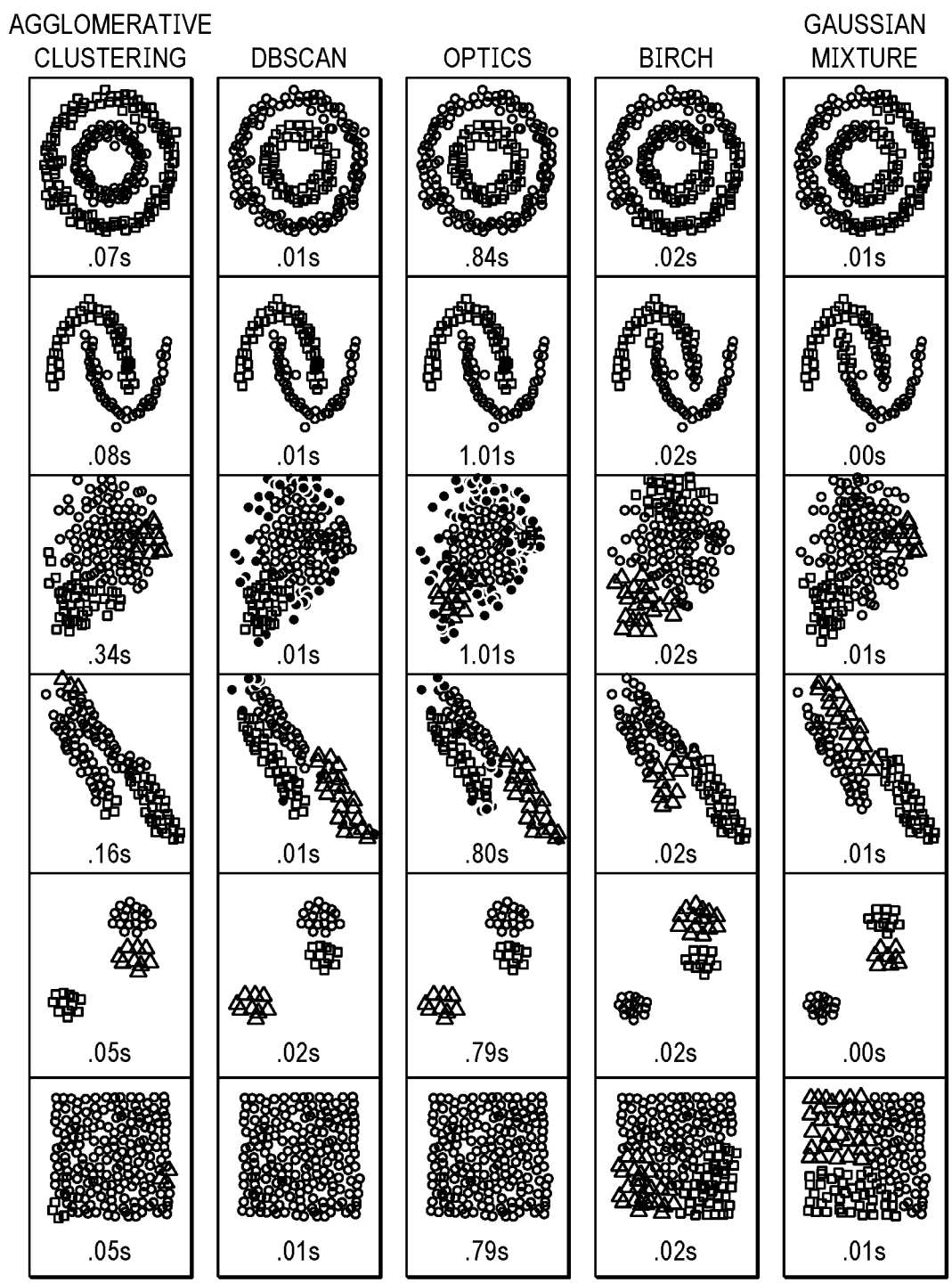

As discussed previously, there exist other approaches to finding clusters in a dataset. FIGS. 10A and 10B illustrate comparisons of such approaches to finding clusters in a dataset; the different approaches are identified by name at the top of each column. The algorithm for each approach assigns datapoints to clusters, each cluster represented by different shapes (e.g., circles, triangles, squares and diamonds) and data considered to be noise represented by solid circles in each plot. The runtime of each algorithm for each dataset is also indicated below each plot. The Correlated Histograms Clustering methodology disclosed herein, as applied to some of the same datasets, is illustrated and described hereinafter with respect to FIGS. 11-13.

Figure 11:
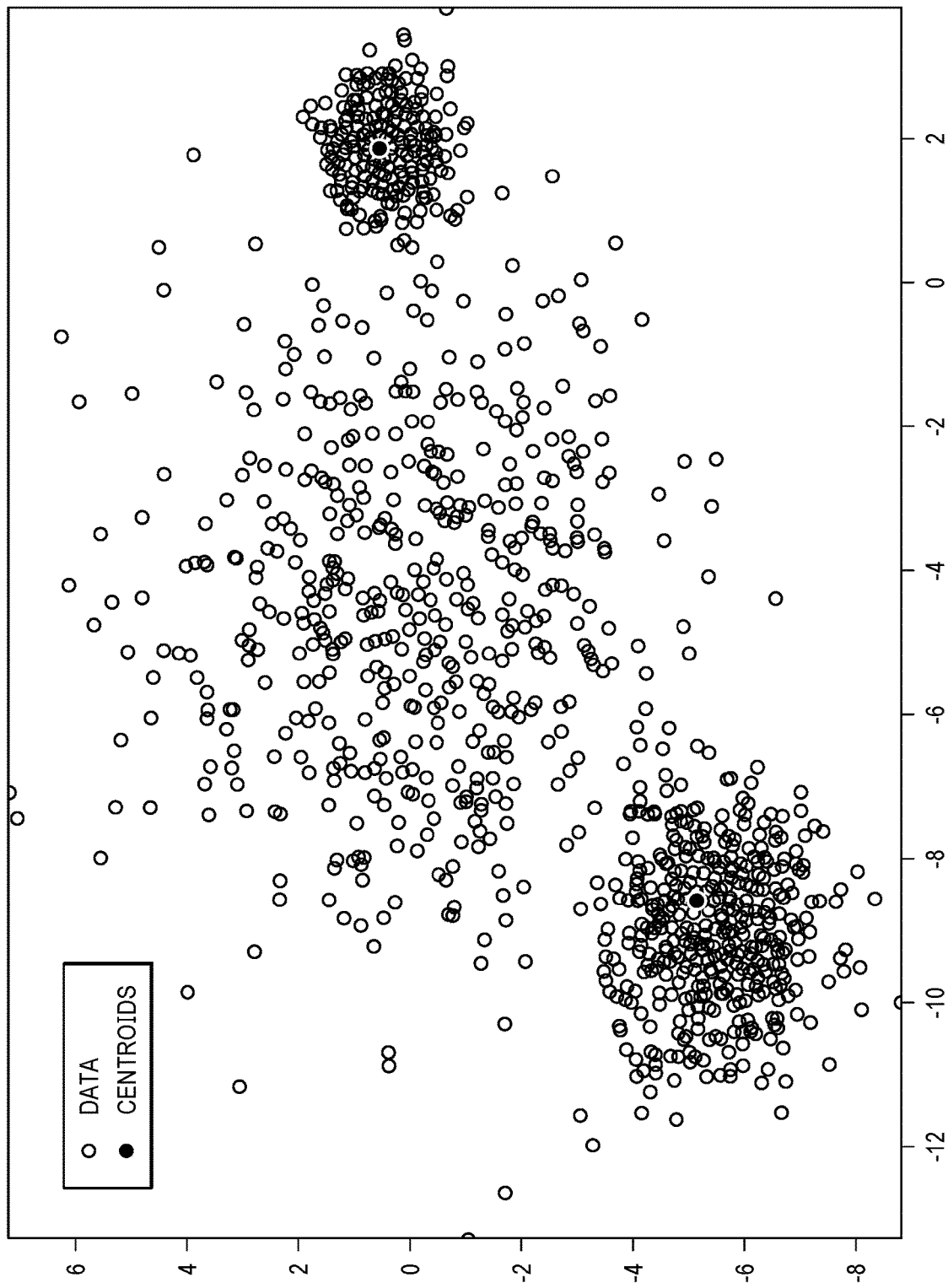
FIG. 11 illustrates correlated histograms applied to the same dataset as row three of FIGS. 10A and 10B with sensitivity equal to 0.50.

FIG. 11 illustrates correlated histograms generated by the disclosed CHC methodology as applied to the same dataset as row three of FIGS. 10A and 10B with sensitivity equal to 0.50. Those skilled in the art will recognize that FIG. 11 illustrates how the disclosed CHC methodology can find modes in a noisy data set without getting lost in the noise. Note that the tight gaussians on the left and right in FIG. 11 have centroids identified while DBSCAN applied to the same dataset, row three of FIG. 10B, fails to discern the noise in the center from the gaussian on the right. If the QRDE is employed along with the Lowland Modality Method, the sensitivity parameter can be adjusted to be more sensitive to centroids.

Figure 12:
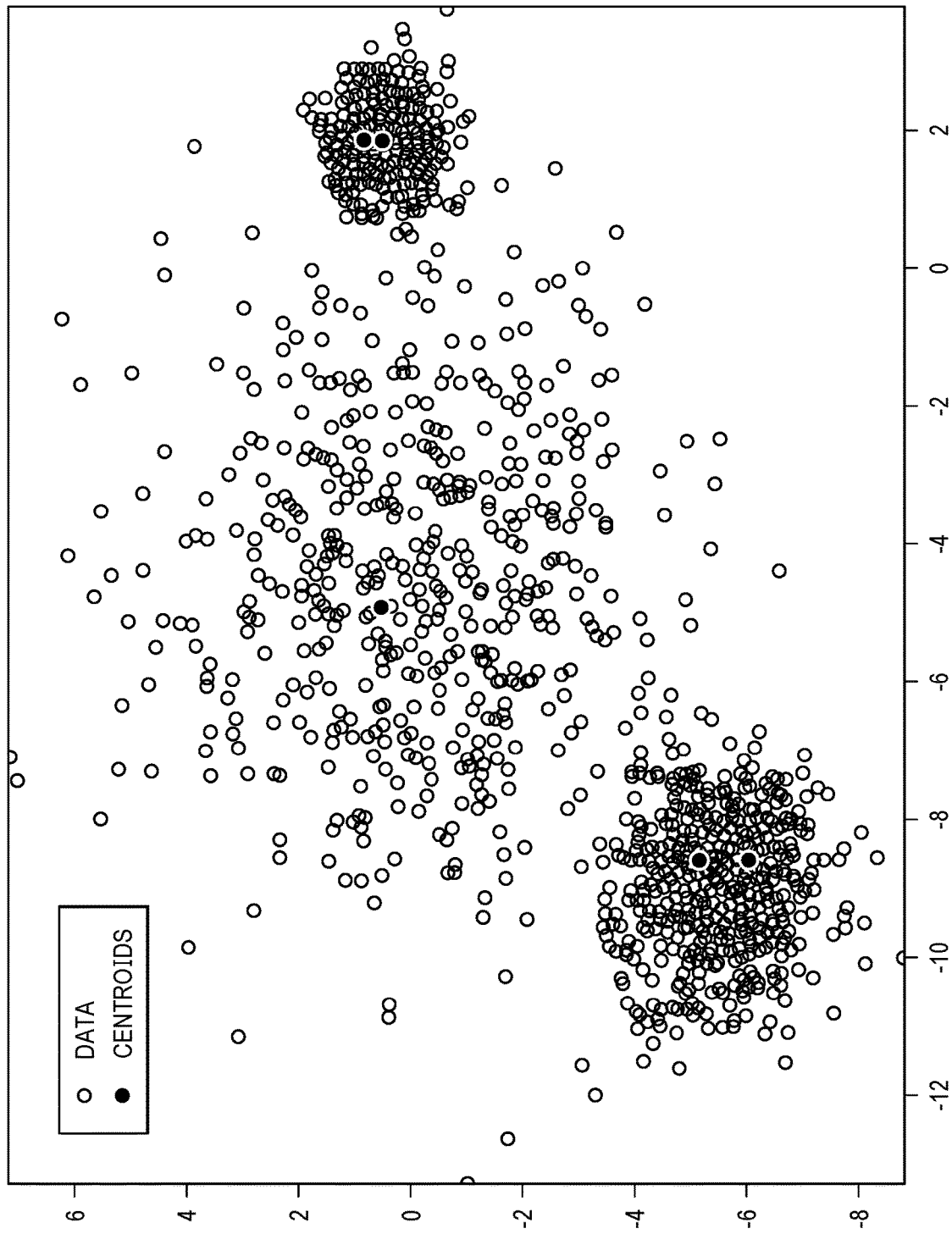
FIG. 12 illustrates correlated histograms applied to the same dataset as row three of FIGS. 10A and 10B with sensitivity equal to 0.90; and,
FIG. 13 illustrates correlated histograms applied to the same dataset as row four of FIGS. 10A and 10B.

FIG. 12 illustrates correlated histograms generated by the disclosed CHC methodology as applied to the same dataset as row three of FIGS. 10A and 10B with sensitivity equal to 0.90. Those skilled in the art will recognize that FIG. 12 illustrates how a centroid was found in the large noisy gaussian when this hyperparameter is set higher. In comparison, it can be seen in row 3 of FIG. 10B that DBSCAN identified this noisy cluster as a part of the tight gaussian on the right, rather than differentiating the two.

Figure 13:
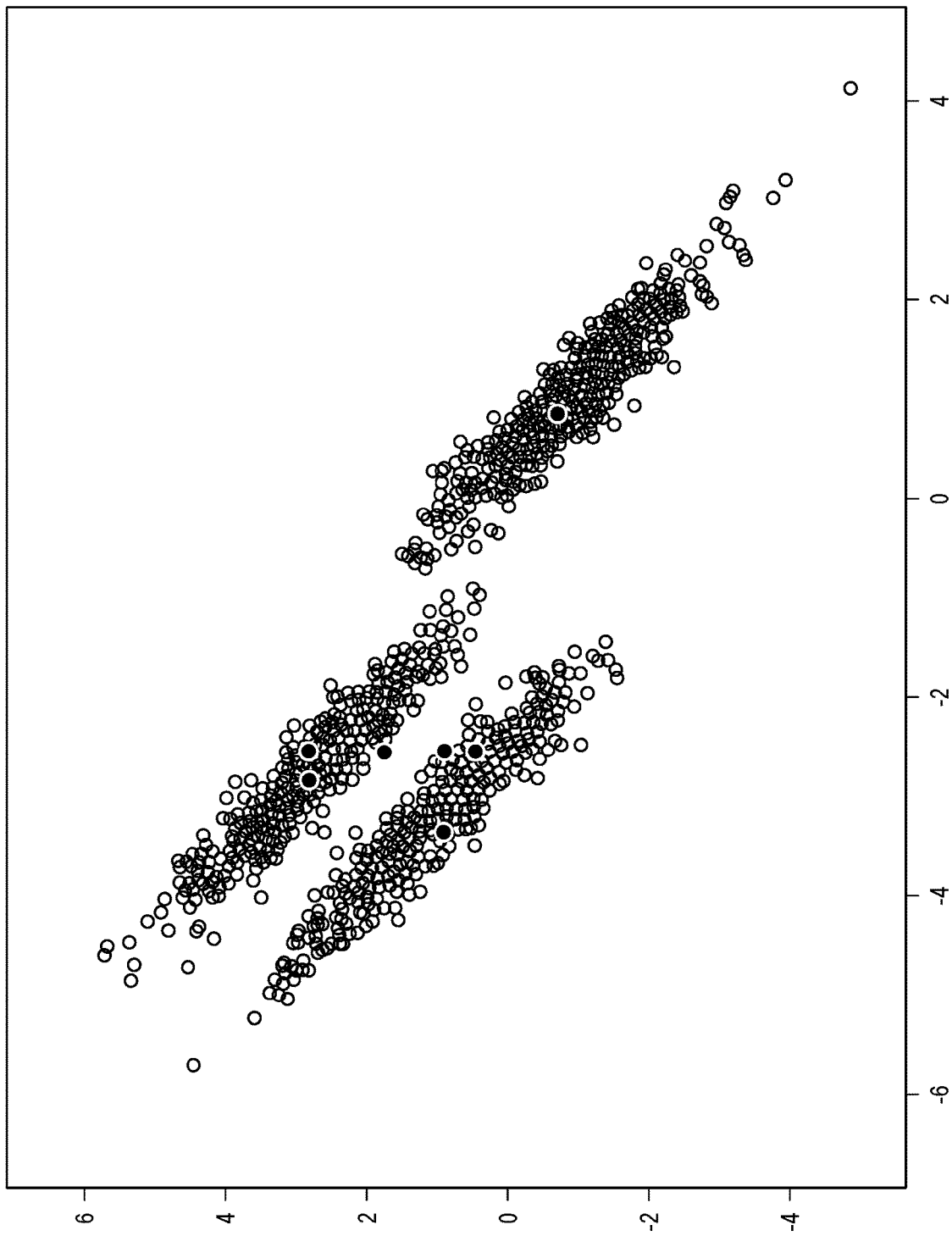

Finally, FIG. 13 illustrates correlated histograms generated by the disclosed CHC methodology as applied to the same dataset as row four of FIGS. 10A and 10B. Correlated histograms utilizes the underlying statistics with respect to the orthogonal dimensions of the data (x, y, . . . ). Thus, in a scenario such as that illustrated in FIG. 13, the CHC methodology doesn't find three centroids cleanly, rather it finds seven centroids. Though the centroids it finds are near the true centroids of each cluster, more advanced techniques could be applied to identify histogram peaks with respect to other functions rather than the orthogonal vectors that the dataset is assumed to be with respect to.

The foregoing has disclosed a novel methodology for generating correlated histogram clusters which can be used to advantage in machine learning systems and the training thereof. For instance, the '075 Publication teaches a monitoring and control system using a machine learning system to control an operation of a real system such as an industrial system. The monitoring and control system refines an initial representation of the industrial system to produce a refined representation of the industrial system based on monitored data from sensors and model output data to control an operation of the industrial system. The monitoring and control system may use the techniques disclosed herein to generate correlated histogram clusters of the monitored data to create smaller datasets for faster processing, which are inputs to the representations of the industrial system. In other words, monitored data would be fed into the correlated histogram cluster system to generate correlated histogram clusters including cluster centroids. The centroids themselves are sufficient inputs for the representations of the industrial system. Varying the sensitivity of the correlated histogram cluster system would give more/fewer centroids to input into the representations. If the input data to a machine learning system is not labeled as disclosed in the '075 Publication, the correlated histogram cluster system can be used to generate labels automatically. These labeled datapoints could then be fed into the representations of the industrial system (or any other supervised learning system). This system classifies an input data set such that a separate supervised learning system could learn the model that fits those classifications. Again, varying the sensitivity will also act as a proxy control into the machine learning system for more/fewer classifications. Also, part of the correlated histogram cluster system is an optimization step that selects histogram bin counts (and, in the case, an adaptive histogram system, the bin widths as well) based on the minimization of a function such as a cost system. Although the embodiments and the advantages have been described in detail, it should be understood that various changes, substitutions, and alterations can be made herein without departing from the spirit and scope thereof as defined by the claims. For example, many of the features and functions discussed above can be implemented in software, hardware, firmware, or a combination thereof. Also, many of the features, functions, and steps of operating the same may be reordered, omitted, added, etc., and still fall within the scope of the claims and equivalents of the elements thereof.

We claim:

1. A method operable with a real system, comprising:
   generating correlated histogram clusters from monitored data from sensors of said real system, comprising:
   1) generating first n histograms for a first n-dimensional data set D of n dimensions;
   2) selecting a subset of said first n-dimensional data set D based on a frequency greater than a threshold to create a second n-dimensional data set D' of said n dimensions;
   3) generating second n histograms for said second n-dimensional data set D' with optimal bin size;
   4) identifying m modes for each dimension of said second n-histograms;

5) for the $i^{th}$ mode of said $j^{th}$ dimension, representing a mode-dimension $m_{ij}$, identifying an index p in said second n-dimensional data set D' by finding a value in j dimensions of said second n-dimensional data set D' closest to said mode-dimension $m_{ij}$, and setting a value $C_i$ of a centroid C equal to said mode-dimension $m_{ij}$;

6) identifying an associated mode data value $D'_{pk}$ for another one of k dimensions, identifying a nearest mode from said second n histograms of $k^{th}$ dimension to said associated mode data value $D'_{pk}$, and assigning a value $C_k$ of said centroid C to said associated mode data value $D'_{pk}$;

7) repeating step 6 for each of said k dimensions through said n dimensions, k≠I;

8) saving said centroid C and repeating steps 5-7 for all m modes of said $j^{th}$ dimension; and 9) repeating steps 5-8 for each of said j dimensions through said n dimensions to generate said correlated histogram clusters;

generating a refined representation of said real system from an initial representation of said real system using a machine learning system, said correlated histogram clusters being an input to said initial representation and representing a transformed and reduced data set of said monitored data to reduce data processing of said machine learning system; and controlling an operation of said real system using said refined representation.

2. The method as recited in claim 1 wherein said selecting comprises selecting said subset for said first n-dimensional data set D with a frequency having a z-score that is positive.

3. The method as recited in claim 1 wherein said generating said second n histograms comprises optimizing a cost function for said first n histograms.

4. The method as recited in claim 1 wherein said generating said second n histograms comprises optimizing a cost function for said first n histograms based on a mean and variance of bin frequencies.

5. The method as recited in claim 1 wherein said generating said second n histograms comprises building density estimates of said second n-dimensional data set D' to acquire modes for said second n-dimensional data set D'.

6. The method as recited in claim 1 wherein said generating said second n histograms comprises building common frequency bins of variable bin sizes.

7. The method as recited in claim 1 wherein value m of said m modes comprises extrema centroid modes being any integer, unimodal, or multimodal.

8. The method as recited in claim 1 wherein said correlated histogram clusters is not limited to a predetermined number of clusters.

9. The method as recited in claim 1 further comprising varying a sensitivity parameter to determine a number of said correlated histogram clusters.

10. The method as recited in claim 9 wherein said sensitivity parameter equals 0.50.

11. A system comprising a processor and memory having instructions executable by said processor, configured to:

generate correlated histogram clusters from monitored data from sensors of a real system, configured to:

1) Generate first n histograms for a first n-dimensional data set D of n dimensions;

2) Select a subset of said first n-dimensional data set D based on a frequency greater than a threshold to create a second n-dimensional data set D' of said n dimensions;

3) Generate second n histograms for said second n-dimensional data set D' with optimal bin size;

4) Identify m modes for each dimension of said second n-histograms;

5) For the $i^{th}$ mode of said $j^{th}$ dimension, representing a mode-dimension $m_{ij}$, identify an index p in said second n-dimensional data set D' by finding a value in j dimensions of said second n-dimensional data set D' closest to said mode-dimension $m_{ij}$, and set a value $C_i$ of a centroid C equal to said mode-dimension $m_{ij}$;

6) Identify an associated mode data value $D'_{pk}$ for another one of k dimensions, identify a nearest-mode from said second n histograms of $k^{th}$ dimension to said associated mode data value $D'_{pk}$, and assign a value $C_k$ of said centroid C to said associated mode data value $D'_{pk}$;

7) Repeat step 6 for each of said k dimensions through said n dimensions, k≠I;

8) Save said centroid C and repeat steps 5-7 for all m modes of said $j^{th}$ dimension; and 9) Repeat steps 5-8 for each of said j dimensions through said n dimensions to generate said correlated histogram clusters;

generate a refined representation of said real system from an initial representation of said real system using a machine learning system, said correlated histogram clusters being an input to said initial representation and representing a transformed and reduced data set of said monitored data to reduce data processing of said machine learning system; and control an operation of said real system using said refined representation.

12. The system as recited in claim 11 wherein said selecting comprises selecting said subset for said first n-dimensional data set D with a frequency having a z-score that is positive.

13. The system as recited in claim 11 wherein said processor and said memory are configured to generate said second n histograms by optimizing a cost function for said first n histograms.

14. The system as recited in claim 11 wherein said processor and said memory are configured to generate said second n histograms by optimizing a cost function for said first n histograms based on a mean and variance of bin frequencies.

15. The system as recited in claim 11 wherein said processor and said memory are configured to generate said second n histograms by building density estimates of said second n-dimensional data set D' to acquire modes for said second n-dimensional data set D'.

16. The system as recited in claim 11 wherein said processor and said memory are configured to generate said second n histograms by building common frequency bins of variable bin sizes.

17. The system as recited in claim 11 wherein value m of said m modes comprises extrema centroid modes being any integer, unimodal, or multimodal.

18. The system as recited in claim 11 wherein said correlated histogram clusters is not limited to a predetermined number of clusters.

19. The system as recited in claim 11 wherein said processor and said memory are configured to vary a sensitivity parameter to determine a number of said correlated histogram clusters.

20. The system as recited in claim 19 wherein said sensitivity parameter equals 0.50.

* * * * *